US008559583B1

(12) United States Patent
Sato et al.

(10) Patent No.: US 8,559,583 B1
(45) Date of Patent: Oct. 15, 2013

(54) PASSIVE COOLING AND DEPRESSURIZATION SYSTEM AND PRESSURIZED WATER NUCLEAR POWER PLANT

(75) Inventors: Takashi Sato, Kanagawa (JP);
Masanori Ino, Kanagawa (JP);
Yasunobu Fujiki, Kanagawa (JP);
Kazunori Hashimoto, Kanagawa (JP);
Junichiro Otonari, Kanagawa (JP);
Hisaki Sato, Kanagawa (JP); Naoko Matsunaga, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 1129 days.

(21) Appl. No.: 12/394,576

(22) Filed: Feb. 27, 2009

(30) Foreign Application Priority Data

Feb. 29, 2008 (JP) ................................. 2008-050873

(51) Int. Cl.
*G21C 9/00* (2006.01)
(52) U.S. Cl.
USPC ............................. 376/283; 376/282; 376/293
(58) Field of Classification Search
USPC ......................................... 376/282–284, 293
See application file for complete search history.

(56) References Cited

U.S. PATENT DOCUMENTS

| | | | | |
|---|---|---|---|---|
| 4,753,771 A | * | 6/1988 | Conway et al. | 376/282 |
| 5,102,617 A | * | 4/1992 | Gluntz et al. | 376/283 |
| 5,180,543 A | * | 1/1993 | Conway et al. | 376/282 |
| 5,217,682 A | * | 6/1993 | Spinks | 376/298 |
| 5,267,281 A | * | 11/1993 | Gillett et al. | 376/282 |
| 5,761,262 A | * | 6/1998 | No et al. | 376/298 |
| 2004/0196948 A1 | | 10/2004 | Conway et al. | |
| 2007/0092053 A1 | * | 4/2007 | Sato | 376/283 |

FOREIGN PATENT DOCUMENTS

EP 353867 A1 * 2/1990

OTHER PUBLICATIONS

IAEA-TECDOC-1391, "Status of advanced light water reactor designs," International Atomic Energy Agency (IAEA), May 2004, pp. 279-306.
T. L. Schulz, "Westinghouse AP1000 advanced passive plant", Nuclear Engineering and Design, Amsterdam, The Netherlands, vol. 236, No. 14-16, Aug. 1, 2006, pp. 1547-1557.

* cited by examiner

*Primary Examiner* — Timothy A Brainard
(74) *Attorney, Agent, or Firm* — Foley & Lardner LLP

(57) ABSTRACT

A passive cooling and depressurization system for a pressurized water nuclear plant is provided with a cooling water pool, a steam supply piping, a heat exchanger, a steam supply valve, a coolant return pipe and an outlet valve. The steam supply piping extends from the gas phase of the pressurizer. The heat exchanger exchanges heat between water stored in the cooling water pool and steam flowing through the steam supply piping. The steam supply valve is equipped on the steam supply piping. The coolant return pipe extends from the heat exchanger to a liquid phase of the reactor pressure boundary. The outlet valve is equipped on the coolant return pipe.

12 Claims, 8 Drawing Sheets

PASSIVE COOLING AND DEPRESSURIZATION SYSTEM AND PRESSURIZED WATER NUCLEAR POWER PLANT

CROSS REFERENCE TO RELATED APPLICATION

This application is based upon and claims the benefit of priority from the prior Japanese Patent Application No. 2008-050873 filed on Feb. 29, 2008; the entire content of which is incorporated herein by reference.

BACKGROUND OF THE INVENTION

The present invention relates to a pressurized water nuclear power plant and a passive cooling and depressurization system therefor.

Most light water reactors (LWRs) have a safety system such as an emergency core cooling system (ECCS). Reactors having an active component such as a pump are called "active safety reactors". On the other hand, reactors with a safety system that has a passive component such as a tank are called "passive safety reactors". Known as a passive safety reactor representing pressurized water reactors (PWRs) is AP1000 (see, for example, IAEA-TECDOC-1391, "Status of advanced light water reactor design 2004," IAEA, May 2004, pp. 279-306; the entire content of which is incorporated herein by reference).

FIG. 7 is a vertical cross sectional view of a containment vessel used in a conventional passive safety PWR (AP1000).

In AP1000, the reactor core 1 is contained in a reactor pressure vessel (RPV) 2. The reactor pressure vessel 2 is connected to two steam generators (SGs) 3 by both a cold leg pipe 4 and a hot leg pipe 5. A reactor coolant pump (RCP) 6 is directly attached to the bottom of the steam generator 3. These devices and pipes, which constitute a reactor pressure boundary, are all contained in a containment vessel (CV) 77.

The containment vessel 77 of AP 1000 is a most typical containment vessel, called "large dry CV", for use in PWRs. The containment vessel 77 is made of steel, because it is designed to be cooled with the external air in case of an accident. Most PWR plant other than AP1000 rather use a large dry CV made of prestressed concrete.

In the containment vessel, an in-containment refueling water storage tank (IRWST) 8 is provided. The in-containment refueling water storage tank 8 works as a gravity-driven cooling system if a loss-of-coolant accident occurs due to a rupture of the cold leg pipe 4 or the like. This gravity-driven cooling system in cooperation with other passive ECCS floods the lower part of the containment vessel with water to a higher level than the cold leg pipe 4.

After that, it is designed that the recirc screen is opened, introducing the water always into the reactor pressure vessel 2 to cool the fuel in the reactor core safely. If the water introduced into the reactor pressure vessel 2 is heated by the decay heat of the fuel in the reactor core, steam is generated and the steam fills the gas phase of the containment vessel 77 resulting in a rise of the temperature and pressure in the containment vessel 77.

A shield building 71 is built outside the containment vessel 77. A cooling water pool 72 of a passive containment cooling system (PCS) is provided on the top of the shield building 71. The cooling water pool 72 is filled with PCS cooling water 73. In case of a LOCA, the PCS cooling water 73 drains onto the containment vessel 77. Air flows into the shield building 71 through a containment cooling air inlet 74 and then a natural circulation force raises the air through the gap between an air baffle 75 and the wall of the containment vessel 77 until the air is released outside through a containment cooling heated air discharge 76 formed at the top of the shield building 71. The drainage of the PCS cooling water 73 and the natural convection of air serve to cool the containment vessel 77 in safety.

In this way, AP1000 can cool the reactor core 1 and the containment vessel 77 with an extremely high reliability only by the passive safety systems requiring no external power source.

FIG. 8 is a block diagram of a passive residual heat removal system and an automatic depressurization system of the AP1000.

The passive residual heat removal (passive RHR) system of the AP1000 has a passive RHR heat exchanger 61. The passive RHR heat exchanger 61 is submerged in refueling water 66 stored in the in-containment refueling water storage tank 8. The in-containment refueling water storage tank 8 is arranged lower than an operating deck 90. The passive RHR heat exchanger 61 is connected to the hot leg pipe 5 via a coolant supply pipe 62. An inlet valve 63 is equipped on the coolant supply pipe 62. The passive RHR heat exchanger 61 is also connected to the cold leg pipe 4 at a position near an outlet of the steam generator 3 via a coolant return pipe 65. An outlet valve 64 is equipped on the coolant return pipe 65.

The inlet valve 63 is kept open during a normal operation and coolant is constantly supplied to the passive RHR heat exchanger 61 via the coolant supply pipe 62. The outlet valve 64 is kept closed during the normal operation.

The cold leg pipe 4 is connected to the reactor pressure vessel 2 so that the coolant cooled by the steam generator 3 circulates in the reactor pressure vessel 2 with a driving force of the reactor coolant pump 6. Note that the cold leg pipe 4 is shown separately on the right side and the left side in FIG. 8 for convenience. In addition, while a pair of steam generators 3 are provided in a known AP1000 as shown in FIG. 7, only a single steam generator 3 is shown in FIG. 8.

During the normal operation of the power plant, since the outlet valve 64 is closed, coolant in the passive RHR heat exchanger 61 does not circulate in the reactor pressure vessel 2 through the cold leg pipe 4. However, when a transient such as a loss of offsite power or a feed-water pump trip occurs and a supply of secondary cooling water to the steam generator 3 stops, the primary coolant is heated by decay heat that is continuously generated in the reactor core 1. Then, the primary coolant passes through the hot leg pipe 5 due to the driving force of natural circulation and heats the secondary cooling water remaining in the steam generator 3. The primary coolant itself is cooled and increases its density (specific weight) in the steam generator 3 and returns into the reactor pressure vessel 2 via the cold leg pipe 4. The primary coolant that returns to the reactor pressure vessel 2 is then heated again by decay heat of the reactor core 1 and naturally circulates between the reactor pressure vessel 2 and the steam generator 3.

As this process proceeds repeatedly for a while, the secondary cooling water in the steam generator 3 decreases by evaporation and it may become impossible to cool the reactor core 1. Therefore, before it becomes impossible to cool the reactor core 1, the outlet valve 64 of the passive RHR automatically opens with a level low signal of the secondary cooling water in the steam generator 3. Then, as a result, the primary coolant in the passive RHR heat exchanger 61 is driven to circulate in the reactor pressure vessel 2 through the coolant return pipe 65 and the cold leg pipe 4.

Decay heat continuously generated in the reactor core 1 is transferred to the refueling water 66 stored in the in-containment refueling water storage tank 8 via the passive RHR heat exchanger 61 and the refueling water 66 will start evaporating in several hours. Evaporation of refueling water 66 may deteriorate environmental conditions of an atmosphere of the containment vessel 2 and may have adverse effects on normal facilities or equipments such as an electric component. However, the facilities and equipment that are important for safety are designed to withstand such environmental conditions.

The generated steam fills up the containment vessel 77. Then, it is cooled by circulating external air and the passive containment cooling function of the PCCS pool 73. And the condensed water flows into the in-containment refueling water storage tank 8. The PCCS pool 73 contains water sufficient for removing decay heat for three days so that in principle the nuclear reactor can be safely cooled by a combination of the passive RHR and the passive containment cooling function even if a loss of AC power source continues for three days.

However, the driving force of the cooling function is the natural circulation force of the primary coolant due to the decay heat generated in the reactor core 1. Therefore, an amount of removable heat is limited to an amount equivalent to the decay heat and the primary coolant cannot progressively be depressurized and cooled. Thus, if the loss of AC power source continues for a long period, the reactor pressure boundary can be kept at high temperature and high pressure about 150 atm (about 15.5 MPa). Such a condition is called a hot shutdown state of nuclear reactor.

To shut down the nuclear reactor more reliably in safety, it is desirable to depressurize and cool the primary coolant. Such a condition is called a cold shutdown state of nuclear reactor.

In the AP1000, if the loss of AC power source continues for more than twenty-four hours, a timer automatically activates an automatic depressurization system (ADS) in order to achieve the cold shutdown. The automatic depressurization system has four stages. The automatic depressurization system first stage 51, the automatic depressurization system second stage 52 and the automatic depressurization system third stage 53 are arranged on an upper part of pressurizer 80. The automatic depressurization system fourth stage 68 is arranged at a position same as a position where coolant supply pipe 62 branches out from the hot leg pipe 5.

The pressurizer 80 is connected to the hot leg pipe 5 by a riser pipe 81. During the normal operation of the nuclear power plant, the primary coolant is stored in the pressurizer 80 to about a half of its capacity. The primary coolant 82 in the pressurizer 80 is heated to a saturation temperature by a heater during the normal operation. Therefore, saturated steam 83 exists in an upper part of the pressurizer 80.

Automatic activations of the ADS is conducted sequentially with time lags from the automatic depressurization system first stage 51, the automatic depressurization system second sage 52, the automatic depressurization system third stage 53 to the automatic depressurization system fourth stage 68. When the automatic depressurization system first stage 51, the automatic depressurization system second stage 52 and the automatic depressurization system third stage 53 are activated, the saturated steam 83 in the pressurizer 80 flows through a discharge pipe 69, is discharged from the sparger 70 in the in-containment refueling water storage tank 8 and then condensed. If the reactor pressure vessel 2 is depressurized to a certain extent during this process, accumulator 84 automatically starts operation to compensate the discharged primary coolant. The driving force of the accumulator 84 is high-pressure nitrogen gas 86 stored inside. As a result, coolant 85 that is also stored inside is injected into the reactor pressure vessel 2 via an injection valve 87 and an ECCS injection pipe 54. At this time, the nitrogen gas 86 that is driving force also flows into the reactor pressure vessel 2.

As the depressurization of the reactor pressure vessel 2 progresses, the automatic depressurization system fourth stage 68 is finally activated to directly discharge the primary coolant and a complete depressurization of the reactor pressure vessel 2 is taken place. After the internal pressure of the reactor pressure vessel 2 decreases sufficiently, the in-containment refueling water storage tank 8 starts injecting water into the reactor pressure vessel 2 as a gravity-driven ECCS. A cold shutdown state of the nuclear reactor is achieved at this stage of process. Then, as a result, the nuclear reactor is shut down satisfactorily in safety. However, the primary coolant that is continuously flowing out from the automatic depressurization system fourth stage 68 completely submerges a lower part of the containment vessel to the level of the cold leg pipe 4. This makes it difficult to restart the nuclear reactor for the normal power operation shortly after the AC power source becomes available.

The natural circulation force due to decay heat generated by the fuel in the reactor core is employed as the driving force of the passive residual heat removal (RHR) system of conventional passive safety pressurized water reactor such as AP1000. Therefore, it is not possible to remove heat more than the decay heat and the nuclear reactor cannot be brought into a cold shutdown state.

Additionally, in a passive RHR that circulates primary coolant with the natural circulation force from decay heat, it is difficult to put the heat exchanger higher than the highest level of the primary coolant (about same as the normal water level in the pressurizer). More specifically, the heat exchanger is arranged below the operating deck that is located below the normal water level in the pressurizer.

If the heat exchanger is located higher than the water level of the pressurizer, coolant flows not into the heat exchanger but into the pressurizer. Therefore, the position of the heat exchanger needs to be lower than the normal water level of the pressurizer. As a result, the difference of vertical level between the heat exchanger and the reactor core is limited to as small as 10 m and it is difficult to increase an injection head due to gravity.

Additionally, use of the water in the in-containment refueling water storage tank as in the passive RHR of AP1000 causes vaporization of this water and the steam may have adverse effects on normal components in the containment vessel such as the electric equipment. Furthermore, after steam generation in the containment vessel due to boiling of water in the in-containment refueling water storage tank or discharging the primary coolant into the containment vessel because of the activation of the final stage of the automatic depressurization system, it is necessary to cool the containment vessel by the passive containment cooling system (PCS). Thus, a large volume of cooling water needs to be stored in the ceiling section of the shield building.

The volume of cooling water to be stored in the ceiling section of the shield building is not particularly a problem for AP1000 whose electric power output is 1,117 MWe. However, if the electric power output of the plant is about 1,700 MWe, a large volume of cooling water as about 4,500 m³ needs to be stored in the ceiling section of the shield building for continuous cooling of the containment vessel by a passive RHR.

BRIEF SUMMARY OF THE INVENTION

The present invention has been made to solve the above problems, and an object of this invention is to minimize the adverse effect on the equipment installed in the containment vessel during the cold shutdown of the pressurized water reactor.

According to an aspect of the present invention, there is provided a passive cooling and depressurization system for a pressurized water nuclear plant having a reactor pressure vessel for containing a reactor core cooled by primary coolant, a pressurizer for pressurizing inside of a reactor pressure boundary where the primary coolant flows and a containment vessel containing the reactor pressure vessel and the pressurizer, the passive cooling and depressurization system comprising: a cooling water pool; a steam supply piping extending from the gas phase section of the pressurizer; a heat exchanger for exchanging heat between water stored in the cooling water pool and steam flowing through the steam supply piping; a steam supply valve being equipped on the steam supply piping; a coolant return pipe extending from the heat exchanger to a liquid phase of the reactor pressure boundary; and an outlet valve being equipped on the coolant return pipe.

According to another aspect of the present invention, there is provided a pressurized water nuclear plant comprising: a reactor core cooled by primary coolant; a pressurizer for pressurizing inside of a reactor pressure boundary where the primary coolant flows; a containment vessel containing the reactor pressure vessel and the pressurizer; a cooling water pool; a steam supply piping extending from the gas phase section of the pressurizer; a heat exchanger for exchanging heat between water stored in the cooling water pool and steam flowing through the steam supply piping; a steam supply valve being equipped on the steam supply piping; a coolant return pipe extending from the heat exchanger to a liquid phase of the reactor pressure boundary; and an outlet valve being equipped on the cooling water return pipe.

BRIEF DESCRIPTION OF THE DRAWINGS

The above and other features and advantage of the present invention will become apparent from the discussion herein below of specific, illustrative embodiments thereof presented in conjunction with accompanying drawings, in which.

DETAILED DESCRIPTION OF THE INVENTION

Hereinafter, embodiments of a pressurized water nuclear power plant according to the present invention will be described with reference to the drawings. The same symbols are given to same or similar configurations, and duplicated descriptions may be omitted.

First Embodiment

Figure 1:
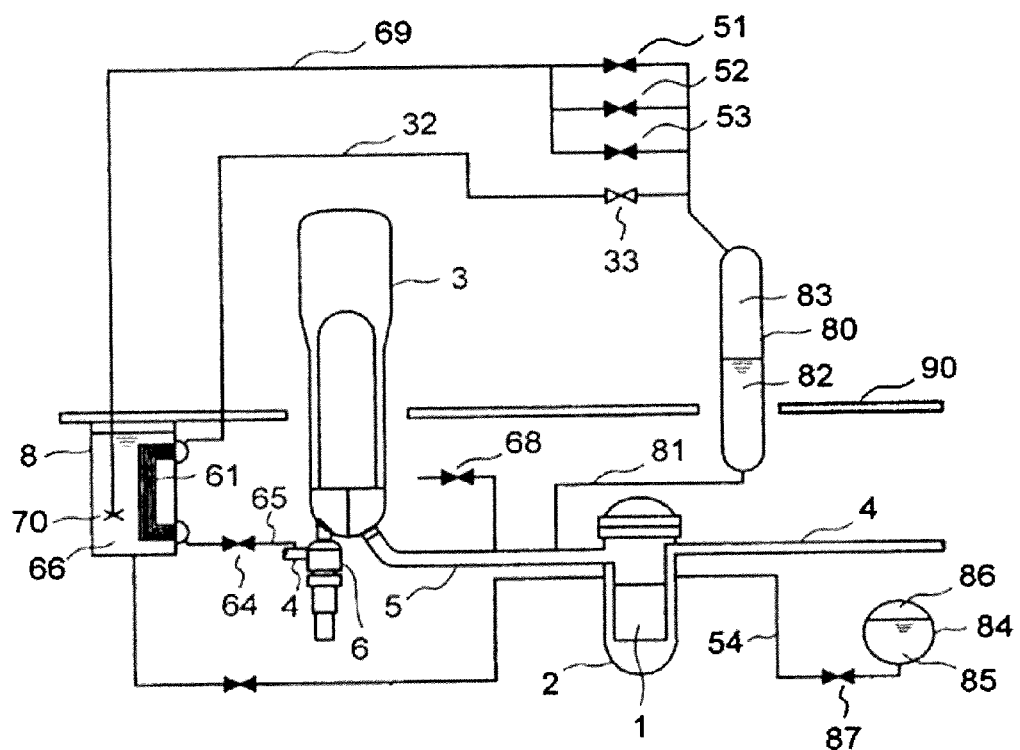
FIG. 1 is a block diagram of a passive cooling and depressurization system of a pressurized water nuclear power plant according to a first embodiment of the present invention.

FIG. 1 is a block diagram of a passive cooling and depressurization system of a pressurized water nuclear power plant according to a first embodiment of the present invention.

A pressurized water nuclear power plant of this embodiment has a reactor core 1 and a reactor pressure vessel 2 containing the reactor core 1. The reactor pressure vessel 2 is connected to, for example, two steam generators 3 with both a cold leg pipe 4 and a hot leg pipe 5. Reactor coolant pumps 6 for circulating primary coolant in the reactor core and the steam generators 3 are attached directly to a bottom of the generators 3.

Figure 7:
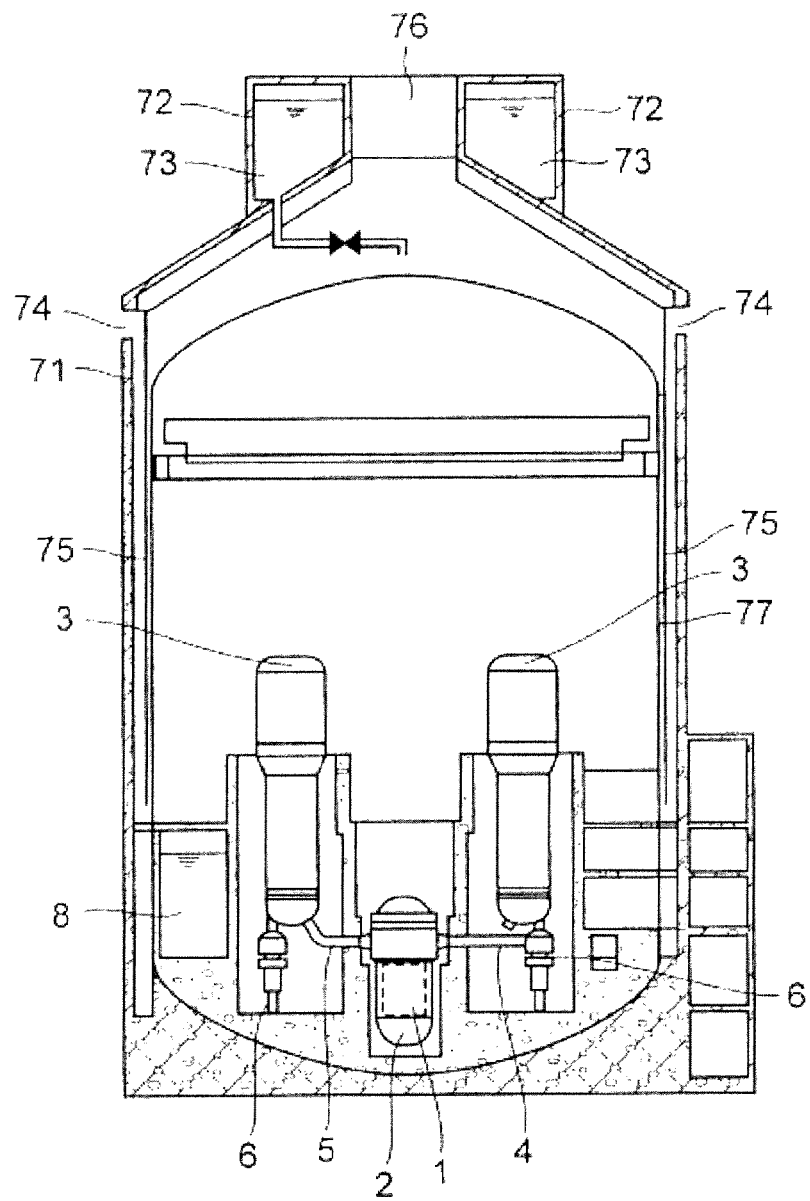
FIG. 7 is a vertical cross sectional view of a containment vessel used in a conventional passive safety PWR (AP1000)

The reactor pressure boundary such as the reactor pressure vessel 2, the cold leg pipe 4 and the hot leg pipe 5, where primary coolant flows, is pressurized by a pressurizer 80. The hot leg pipe 5 is connected to the pressurizer 80 via a riser pipe 81. During a normal operation, the primary coolant is stored in the pressurizer 80 to about a half of its capacity. The primary coolant 82 in the pressurizer 80 is heated to a saturation temperature by a heater during the normal operation. Therefore, saturated steam 83 exists in an upper part of the pressurizer 80. The reactor pressure vessel 2 containing the reactor core 1 and the pressurizer 80 are contained in a containment vessel 77 (see FIG. 7).

The passive cooling and depressurization system (PCDS) according to this embodiment has an in-containment refueling water storage tank 8, a passive RHR heat exchanger 61, a steam supply pipe 32, a steam supply valve 33, a coolant return pipe 65 and an outlet valve 64. The passive RHR heat exchanger 61 is arranged in the in-containment refueling water storage tank 8.

The steam supply pipe 32 extends from a gas phase of the pressurizer 80 that is filled with saturated steam 83 to the passive RHR heat exchanger 61. The passive RHR heat exchanger 61 exchanges heat between the water stored in the in-containment refueling water storage tank 8 and the steam flowing through the steam supply pipe 32. Therefore, the in-containment refueling water storage tank 8 can be referred to as a cooling water pool that can store cooling water that exchanges heat in the passive RHR heat exchanger 61. The steam supply valve 33 is equipped on the steam supply pipe 32.

The coolant return pipe 65 extends from the passive RHR heat exchanger 61 to the cold leg pipe 4 that is a liquid phase of the reactor pressure boundary. The outlet valve 64 is equipped on the coolant return pipe 65.

Figure 8:
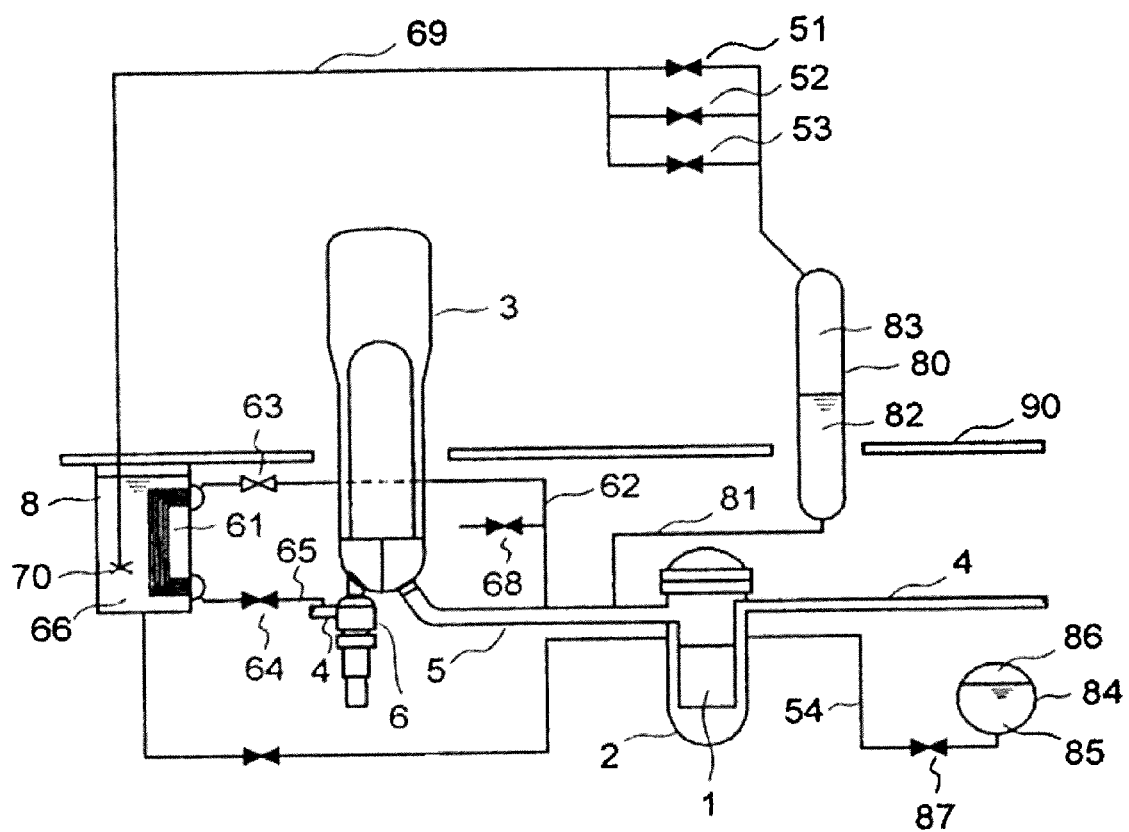
FIG. 8 is a block diagram of a passive residual heat removal system and an automatic depressurization system of the AP1000.

The passive cooling and depressurization system of the pressurized water nuclear power plant according to this embodiment differs from the AP1000 shown in FIG. 8, for example, in that it can take saturated steam 83 in the pressurizer 80 directly to the passive RHR heat exchanger 61 and cool and condense it. That is, the coolant supply pipe 62 (see FIG. 8) for taking primary coolant and the inlet valve 63 (see FIG. 8) of the AP1000 are eliminated, and instead the steam supply pipe 32 that branches out of the gas phase of the pressurizer 80 and the steam supply valve 33 are installed.

The steam supply valve 33 according to this embodiment is a control valve that can be adjustably opened. In other words, the steam supply valve 33 is a steam regulator valve that can regulate the rate of steam passing through. During the normal operation, the steam supply valve 33 is opened to such an extent that steam can be supplied at a rate equivalent to the rate of generation of decay heat. As a result, saturated steam 83 in the pressurizer 80 reaches to the passive RHR heat exchanger 61 through the steam supply pipe 32 and is cooled. The coolant (condensed water) that is cooled by the passive RHR heat exchanger 61 is then stored in the passive RHR heat exchanger 61.

If a water level in the secondary part of the steam generators 3 falls since a transient such as a loss of AC power source or a loss of feed water occurs and a supply of water to a secondary part of the steam generators 3 is stopped, the outlet valve 64 that is constantly closed during the normal operation is automatically opened. Then, as a result, the coolant stored in the passive RHR heat exchanger 61 is led into the reactor pressure vessel 2 through the coolant return pipe 65 and the cold leg pipe 4 by gravity to cool the reactor core 1.

The primary coolant heated by the residual heat that is constantly being generated in the reactor core 1 evaporates again in the gas phase of the pressurizer 80 and is then led to the passive RHR heat exchanger 61 through the steam supply valve 33 and the steam supply pipe 32 so as to be cooled and condensed. As this process proceeds repeatedly, the decay heat that is generated in the reactor core 1 is continuously removed.

Since the steam supply valve 33 is kept open to the extent corresponding to the rate of generation of decay heat and does not allow excess steam pass more than the rate equivalent to the rate of generation of decay heat, the nuclear reactor is not unnecessarily depressurized and cooled and can maintain a hot shutdown state. If the AC power source or the supply of water is restored within a short period in this state, the nuclear reactor can be restarted to the normal operation immediately.

However, on the other hand, if the AC power source is not recovered for a long period of about 24 hours, it is desired to depressurize the nuclear reactor and put it into a cold shutdown state from the viewpoint of securing safety. In such a case, the nuclear power plant having a conventional passive RHR cannot be put into a cold shutdown state by means of the passive RHR alone.

Therefore, in such a nuclear power plant having a conventional passive RHR, an automatic depressurization system (ADS) needs to be activated additionally in order to bring the nuclear reactor into a cold shutdown state. If the automatic depressurization system is activated and the automatic depressurization system fourth stage 68 is finally opened, primary coolant may flow out to the bottom of the containment vessel to submerge completely to the level of the cold leg pipe 4.

A nuclear power plant using the passive RHR according to this embodiment can depressurize the nuclear reactor by opening the steam supply valve 33 to a larger extent and supplying steam at a higher rate. In the case of a pressurized water nuclear power plant with an electric power output of about 1,700 MWe, the steam generation rate equivalent to decay heat is about 230 t/h. On the other hand, it is sufficient to evaporate and condense about 120 t of primary coolant in order to depressurize about 300 t of primary coolant to the cold shutdown state. Therefore, the nuclear reactor can be brought into the cold shutdown state in about an hour by opening the steam supply valve 33 to an extent corresponding to about 1.5 times of the rate equivalent to decay heat.

Thus, by using the passive cooling and depressurization system of this embodiment, a nuclear reactor can be brought into the cold shutdown state without activating the automatic depressurization system. Therefore, a risk of submergence of the lower part of the containment vessel 2 can be reduced. Then, the adverse effect on the equipment installed in the containment vessel in case of the cold shutdown of the pressurized water reactor can be minimized.

Therefore, if the AC power source is recovered in a long-term more than about twenty-four hours from initiation of loss of the AC power source, any significant property damage of the plant can be avoided and the plant can be restarted to a power operation within a relatively short period. If the AC power source is recovered in a short-term, the plant can be restarted immediately to the normal operation. That is, the pressurized water nuclear power plant according to this embodiment is highly reliable in terms of power supply.

Second Embodiment

Figure 2:
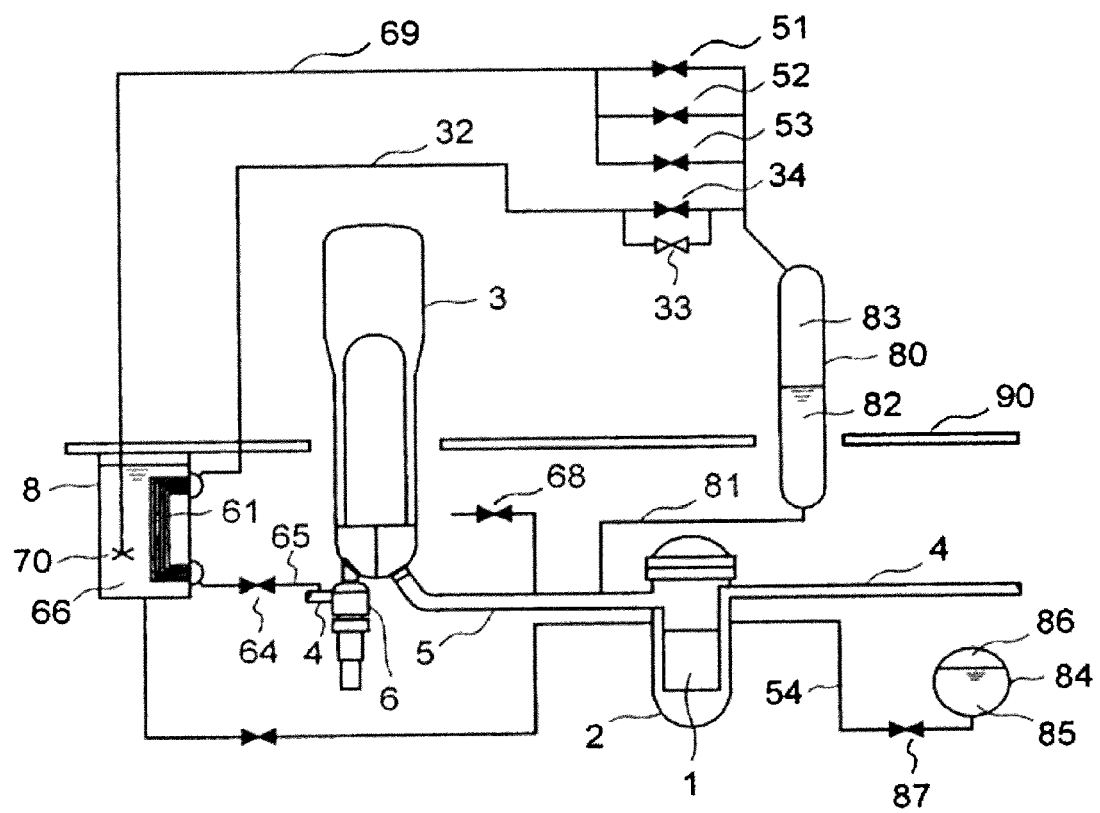
FIG. 2 is a block diagram of a passive cooling and depressurization system of a pressurized water nuclear power plant according to a second embodiment of the present invention.

FIG. 2 is a block diagram of a passive cooling and depressurization system of a pressurized water nuclear power plant according to a second embodiment of the present invention.

The passive cooling and depressurization system according to this embodiment has a depressurization valve 34 equipped in parallel with the steam supply valve 33 in addition to the cooling and depressurization system according to the first embodiment. The steam supply valve 33 is kept open to an adjusted extent that steam can be supplied at a rate equivalent to the rate of generation of decay heat. An orifice (not shown) may be arranged in series with the steam supply valve 33 in order to accurately limit the flow rate of steam to a rate equivalent to the rate of generation of decay heat. The depressurization valve 34 is kept closed.

In such a pressurized water nuclear power plant, the steam supply valve 33 is kept open and the depressurization valve 34 is closed to maintain the nuclear reactor in the hot shutdown state. Then, the flow rate of steam passing through the steam supply pipe 32 can be increased by opening the depressurization valve 34, while the steam supply valve 33 is kept open. As a result, the nuclear reactor can be brought into a cold shutdown state. In other words, it is possible to shift the operation state of the plant by opening/closing a valve without continuously adjusting the extent of opening of the steam supply valve 33. Therefore, it is possible to select operation state of the system more reliably.

In the case of design to depressurize the nuclear reactor mildly avoiding a rapid depressurization, several depressurization valves 34 may be arranged in parallel. Then, the pressure of the nuclear reactor can be gradually reduced by sequentially opening the valves to increase the number of opened valves.

Third Embodiment

Figure 3:
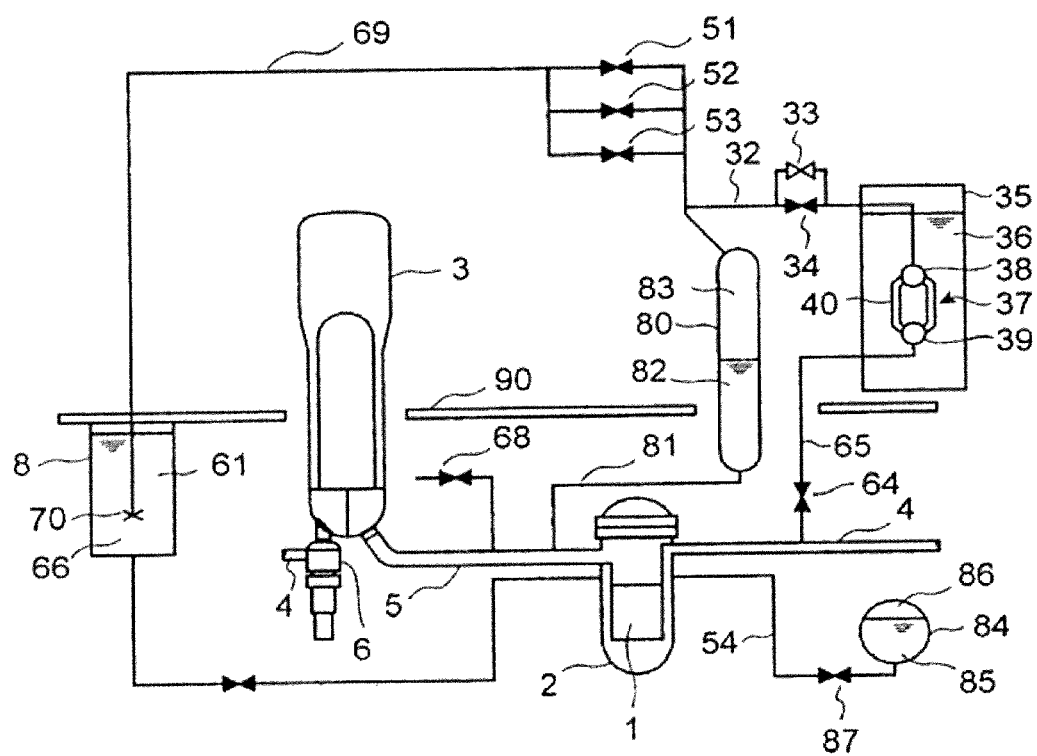
FIG. 3 is a block diagram of a passive cooling and depressurization system of a pressurized water nuclear power plant according to a third embodiment of the present invention.

FIG. 3 is a block diagram of a passive cooling and depressurization system of a pressurized water nuclear power plant according to a third embodiment of the present invention.

The passive cooling and depressurization system according to this embodiment has a passive cooling and depressurization system (PCDS) pool 35 and a PCDS heat exchanger 37. The PCDS pool 35 stores PCDS pool water. The PCDS heat exchanger 37 is arranged in the PCDS pool 35. In other words, the PCDS pool 35 is a cooling water pool that can store cooling water that exchanges heat in the PCDS heat exchanger 37.

The steam supply pipe 32 extends from a steam phase of the pressurizer 80 that is filled with saturated steam to the PCDS heat exchanger 37. The steam supply valve 33 is equipped on the steam supply pipe 32. The coolant return pipe 65 extends from the PCDS heat exchanger 37 to the cold leg pipe 4 that is a part of the reactor pressure boundary. The outlet valve 64 is equipped on the coolant return pipe 65.

The PCDS heat exchanger 37 has an upper header 38 and a lower header 39. An O-type arrangement heat exchanger tube 40 that is formed in a shape of character "O" is equipped between the upper header 38 and the lower header 39. The passive RHR heat exchanger 61 that is the heat exchanger of the passive cooling and depressurization system of the first embodiment adopts a C-type arrangement of which a heat exchanger tube is only arranged in one side. On the other hand, the O-type arrangement heat exchanger tube 40 used in the heat exchanger of the passive cooling and depressurization system of this embodiment has an advantage of a larger heat conduction area.

The PCDS pool 35 is formed independently of the in-containment refueling water storage tank 8 that is used as a cooling water pool for storing cooling water of the passive cooling and depressurization system in the first embodiment. The PCDS pool 35 is located higher than the in-containment refueling water storage tank 8. For example, the PCDS pool 35 may be located above the operating deck 90.

To lead the primary coolant keeping it as liquid to the heat exchanger of the passive RHR by natural circulation force, the heat exchanger needs to be located below the normal water level of the pressurizer 80 that is the highest position of the primary coolant. For this reason, in the case of the AP1000, the in-containment refueling water storage tank 8 arranged below the operating deck 90 is used as a cooling water pool of the passive cooling and depressurization system.

In this case, the level difference between the highest position of the heat exchanger of the passive cooling and depressurization system and the highest position of the reactor core 1 is only about 10 m and hence it is not possible to provide a large injection head for injecting condensed water into the reactor core 1. Then, as a result, water can be injected into the reactor core only at a very low circulation flow rate that is produced by natural circulation so that the nuclear reactor cannot be brought into a cold shutdown state, although it can be put into a hot shutdowns state.

To the contrary, since it is designed in this embodiment that the steam 83 in the pressurizer 80 is led into the PCDS heat exchanger 37, the position of the PCDS heat exchanger 37 is not restricted by the position of the pressurizer 80. Since steam is gas and highly mobile, if there is a difference of pressure between the inside of the pressurizer 80 and the inside of the PCDS heat exchanger 37, the difference of pressure operates as drive source for raising steam to any place, disregarding potential energy.

Inside of the PCDS heat exchanger is kept depressurized and the pressure in the PCDS heat exchanger is kept much lower than the pressure in the pressurizer 80 because the supplied steam is cooled and condensed by the PCDS pool water 36 located externally. Then, as a result, saturated steam 83 in the pressurizer 80 can be smoothly led into the PCDS heat exchanger 37.

Thus, the PCDS pool 35 can be arranged higher than the operating deck 90 in this embodiment. In other words, it can be arranged that at least a part of the PCDS heat exchanger 37 is higher than the liquid level in the pressurizer. As a result, the level difference between the highest position of the PCDS heat exchanger 37 and the highest position of the reactor core 1 can be as large as about 22 meters.

Therefore, when the depressurization valve 34 is opened to operate in a depressurization mode, water can be immediately and smoothly injected into the reactor core 1 by gravity with a large head even if a large amount of condensed water accumulates in the PCDS heat exchanger 37. In other words, a passive cooling and depressurization system that has the PCDS pool 35 located higher than the operating deck 90 can cool and depressurize the reactor core very smoothly.

Fourth Embodiment

Figure 4:
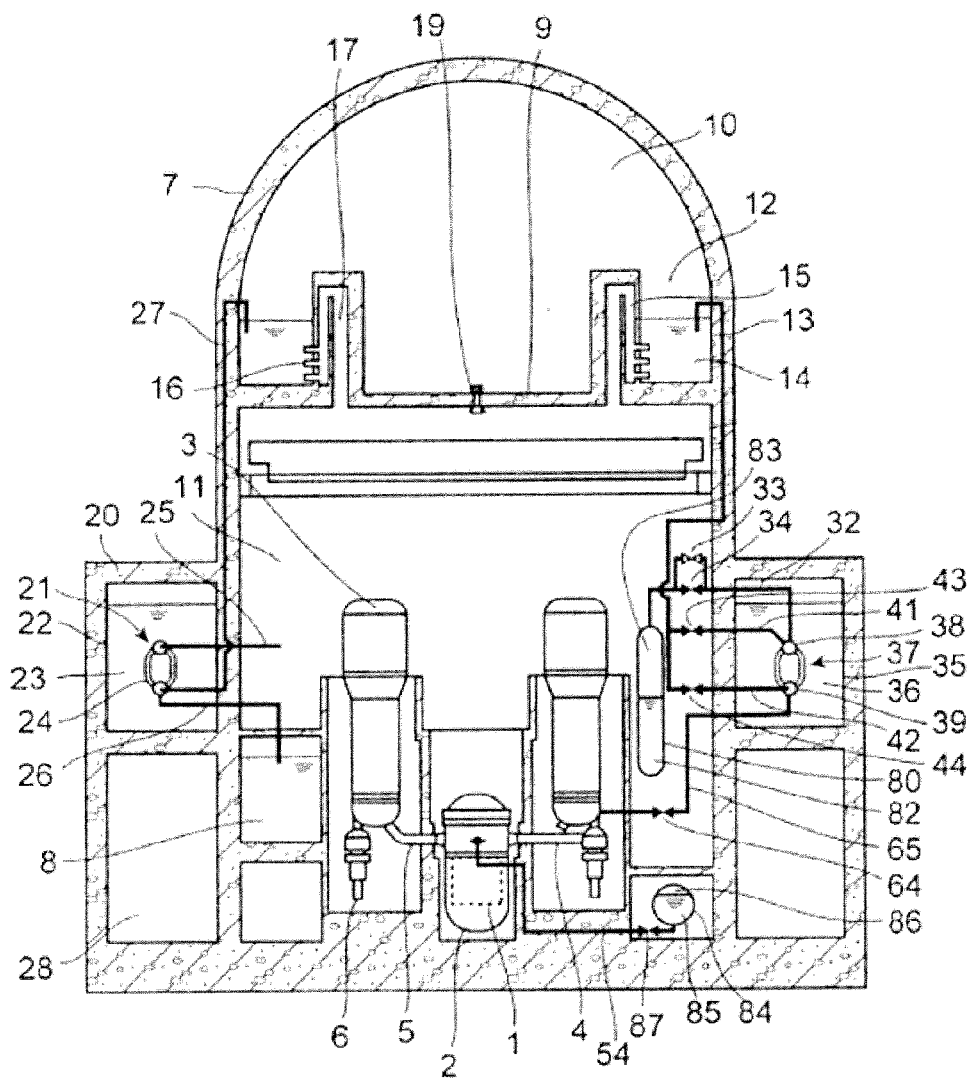
FIG. 4 is a block diagram of a passive cooling and depressurization system shown with a vertical cross sectional view of a containment vessel of a pressurized water nuclear power plant according to a fourth embodiment of the present invention.

FIG. 4 is a block diagram of a passive cooling and depressurization system shown with a vertical cross sectional view of a containment vessel of a pressurized water nuclear power plant according to a fourth embodiment of the present invention.

The containment vessel according to this embodiment has a main containment vessel (MCV) 7 and a diaphragm 9. The main containment vessel 7 is made of reinforced concrete and is composed of a flat disk, a hollow cylinder mounted on the flat disk and a semispherical cover covering the top of the hollow cylinder. The diaphragm 9 is expanding horizontally, for example.

The diaphragm 9 partitions the main containment vessel 7 into a first space and a second space. Hereinafter, the first space shall be referred to as "upper vessel 10" and the second space shall be referred to as "lower vessel 11". In this embodiment, the upper vessel 10 is located higher than the lower vessel 11. A vacuum breaker 19 that opens when the pressure difference between the upper vessel 10 and the lower vessel 11 exceeds a preset value may be provided on the diaphragm 9. All of the equipments and piping that constitute the reactor pressure boundary are contained in the lower vessel 11.

A pressure suppression chamber 12 is provided in the containment vessel. The pressure suppression chamber 12 has a suppression pool 13. The suppression pool 13 is formed to store water and stores suppression pool water 14 to water level of, for example, 5 m or more in a normal state. In this embodiment, the pressure suppression chamber 12 is provided in the upper vessel 10. The pressure suppression chamber 12 opens at, for example, the top, and communicates with the other part of the upper vessel 10.

In the containment vessel, LOCA vent pipes 15 connecting the lower vessel 11 and the suppression pool 13 are provided. At the conjunction between the LOCA vent pipes 15 and the suppression pool 13, horizontal vents 16 that extend horizontally may be provided. Since the lower vessel 11 is connected to the LOCA vent pipes 15, a riser section 17, that is a circular part of the diaphragm 9 extending upward to a higher level than the level of the suppression pool water 14, is formed to avoid that the suppression pool water 14 flow down to the lower vessel 11 during normal condition.

A passive containment cooling system (PCCS) building 20 is located outside the main containment vessel 7. The PCCS building 20 is formed integrally with a fuel pool building 28, for example, above the fuel pool building 28. Equipment of the passive containment cooling system 21 is provided in the PCCS building 20.

The passive containment cooling system 21 has a PCCS pool 22 provided in the PCCS building 20 and a PCCS heat exchanger 24. The PCCS pool 22 is configured to store PCCS pool water 23. The PCCS heat exchanger 24 is placed to be submerged in the PCCS pool water 23. The PCCS heat exchanger 24 is connected to a suction pipe 25 of which end opens to the lower vessel 11. The PCCS heat exchanger 24 is also connected to a return pipe 26 that returns the condensed water back into the lower vessel 11. Further, a PCCS vent pipe 27 through which the noncondensable gases that are not condensed in the PCCS heat exchanger 24 are vented to the upper vessel 10 is provided.

In case of an accident such as a LOCA, the steam introduced into the lower vessel 11 is guided, together with the noncondensable gases, into the PCCS heat exchanger 24 because of the pressure difference between nodes. Since the suction pipe 25 remains open all the time, no operation of opening a valve after the accident is required at all. The opening of the suction pipe 25 may be arranged at any position in the lower vessel 11 as long as it is above the water level of the submerged lower vessel 11 in case of an accident.

The steam condensed in the PCCS heat exchanger 24 flows back into the lower vessel 11 through the return pipe 26, by gravity, and is utilized as a water source of the passive ECCS, such as an in-containment refueling water storage tank 8. The noncondensable gases, such as nitrogen and hydrogen, that are not condensed in the PCCS heat exchanger 24, are vented through the PCCS vent pipe 27 into the suppression pool 13 provided in the upper vessel 10. The PCCS vent pipe 27 is embedded in the wall of the main containment vessel 7, for example, from a viewpoint of arrangement efficiency.

The PCCS pool water 23 is clean cooling water that is free from radioactivity even in case of an accident and the gas phase of the PCCS pool 23 communicates with the external air through an air outlet. If the PCCS pool water 23 is boiled to generate steam by heating, the steam is directly discharged to the external air that is the ultimate heat sink.

Of the passive cooling and depressurization system of this embodiment, the PCDS pool 35 is located outside the main containment vessel 7. The PCDS pool 35 stores PCDS pool water 36. A PCDS heat exchanger 37 is submerged in the PCDS pool water 36.

Noncondensable gas vent pipes 41 and 42 are connected respectively to the upper header 38 and the lower header 39 of the PCDS heat exchanger 37. The noncondensable gas vent pipes 41 and 42 extend to the pressure suppression pool water 14. Vent valves 43 and 44 are equipped respectively on the noncondensable gas vent pipes 41 and 42. Thus, noncondensable gases accumulated in the PCDS heat exchanger 37 can be vented into the pressure suppression pool water 14 through the noncondensable gas vent pipes 41 and 42.

Since the PCDS pool 35 is located outside of the main containment vessel 7, if the PCDS pool water 36 is boiled to generate a large amount of steam, the steam can be directly discharged into the ultimate heat sink that is the external air.

In case that the in-containment refueling water storage tank 8 (see FIG. 7) located in the main containment vessel 7 is used as the cooling water pool of the passive cooling and depressurization system, if the passive cooling and depressurization system is activated and the water in the cooling water pool evaporates within a few hours, the pressure and the temperature in the containment vessel increase and the environment gets deteriorated. Then, the ordinary electric equipment installed in the containment vessel can be damaged.

However, in this embodiment, the steam generated as the PCDS pool water 36 evaporates is discharged into the external air. Therefore, the steam generated as a result of heat removal of the passive cooling and depressurization system does not deteriorate the environment in the containment vessel. Then, as a result, there is provided a very significant advantage from the viewpoint of reliability of power supply in that the plant can restart to the power operation immediately after the AC power source is recovered within a few hours.

When the depressurization valve 34 is opened and the nuclear reactor pressure is depressurized to some extent and reaching at the set point of the accumulator 84, the injection valve 87 is automatically opened, and the coolant 85 is injected into the reactor pressure vessel 2 due to the high-pressure nitrogen gas 86 stored in the accumulator 84. At this time, the nitrogen gas 86 also gets into the reactor pressure vessel 2 and eventually reaches to the gas phase of the pressurizer 80. Then, the non-condensable nitrogen carried by the steam in the pressurizer to the PCDS heat exchanger 27. Since nitrogen gas is non-condensable gas, it is not condensed and simply stays there even if it is cooled by the PCDS heat exchanger 37. If such a situation occurred, the pressure difference between the pressurizer 80 and the PCDS heat exchanger 37 would not be maintained and the PCDS heat exchanger 37 would lose its function.

However, in this embodiment, the nitrogen gas staying in the PCDS heat exchanger 37 can easily be discharged into the pressure suppression pool water 14 by opening the vent valves 43 and 44 manually whenever necessary.

Even in a case that a part of the reactor core fuel is damaged and a large amount of hydrogen gas is generated due to a metal-water reaction that takes place between the metal such as a fuel cladding and the reactor water at a high temperature, the hydrogen gas can be discharged into the pressure suppression pool water 14 with a large amount of radioactive substances by opening the vent valves 43 and 44. That is, the passive cooling and depressurization system according to this embodiment can satisfactorily carry out its safety function even if a large amount of hydrogen gas is generated.

Additionally, in this embodiment, the large amount of radioactive substances generated in the reactor can be removed by scrubbing in the pressure suppression pool water 14 to prevent the inside of the containment vessel, the inside of the lower vessel 11 in particular, from being contaminated by the radioactive substances.

In this embodiment, the PCCS pool 22 of the passive containment cooling system 21 for cooling the containment vessel at an accident is located outside the main containment vessel 7. Therefore, the PCCS pool 22 and the PCDS pool 35 can be integrally formed as a circle along the side wall of the main containment vessel 7. It can be configured that the pool water of the two pools communicates with each other by providing a communication pipe (not shown) instead of integrating the pools.

The passive containment cooling system 21 cools the main containment vessel 7 if a large amount of primary coolant is discharged into the main containment vessel 7 due to a pipe rupture accident or other reason. On the other hand, the passive cooling and depressurization system cools the nuclear reactor when the reactor is isolated since no accident such as a pipe rupture has been occurred and a large amount of the primary coolant is not discharged into the main containment vessel. Therefore, the passive containment cooling system and the passive cooling and depressurization system are not activated at the same time. In other words, it is not necessary to independently provide PCDS pool water 36 and PCCS pool 22. Therefore, the total amount of cooling water can be reduced by utilizing the PCDS pool water 36 and the PCCS pool water 23 in common.

The total volume of cooling water is about 4,500 $m^3$ to cool the containment vessel of about 1,700 MWe class of a nuclear power plant continuously for three days. Since the PCDS pool 35 and the PCCS pool 22 are located on a lower floor adjacent to the side wall of the main containment vessel 7 in this embodiment, it is not necessary to store a large amount of cooling water on the ceiling of the shield building. Therefore, it is easy to design the building as earthquake-proof and to provide countermeasures against aircraft crashes, and so the plant security is greatly improved.

As described above, in the nuclear power plant according to this embodiment, the nuclear reactor can be safely shutdown for three days only by passive components. Therefore, if a loss of the AC power source is prolonged for a long period due to a huge earthquake, the safety of the plant can be maintained without relying on external power and external active cooling systems.

Fifth Embodiment

Figure 5:
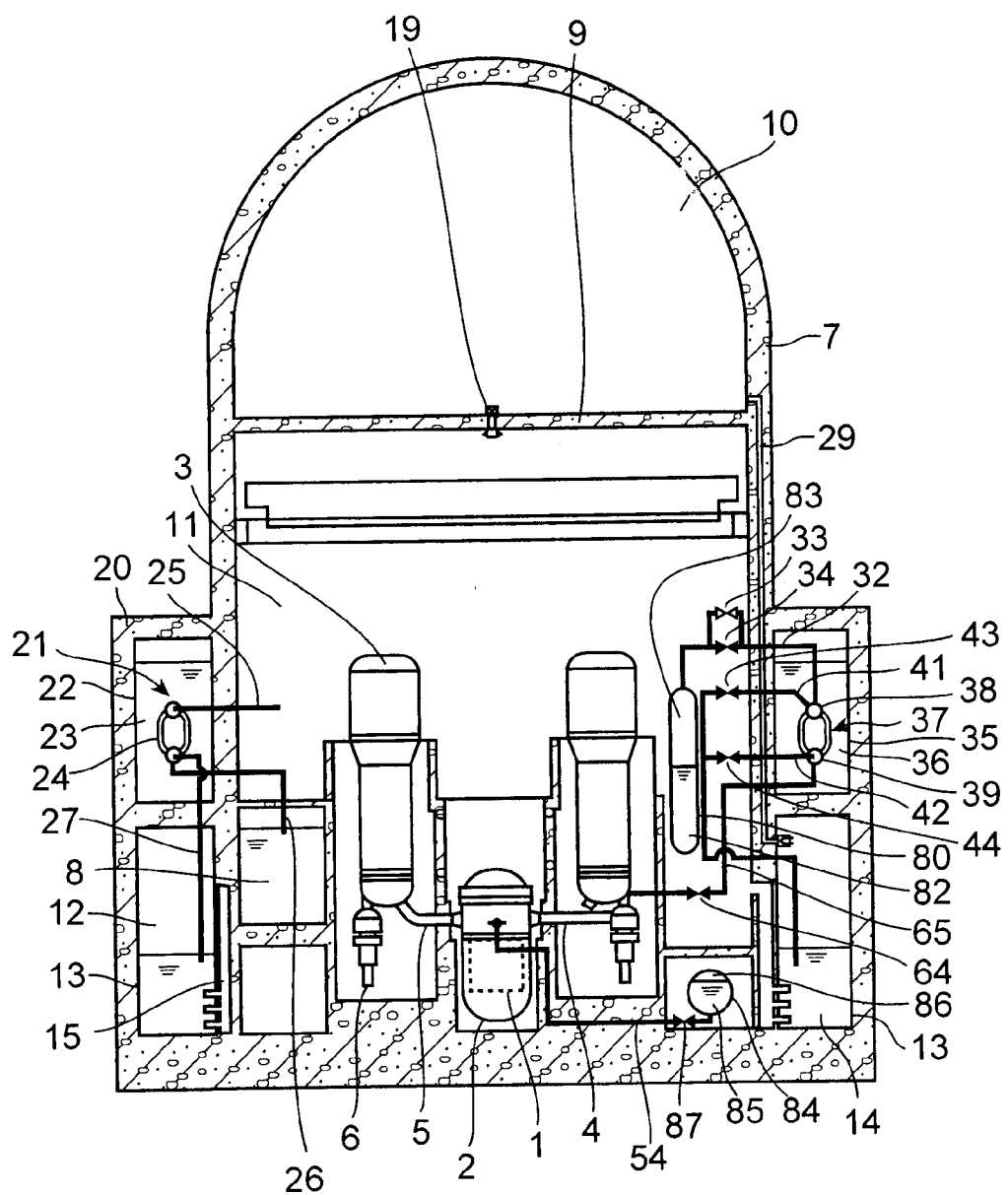
FIG. 5 is a block diagram of a passive cooling and depressurization system shown with a vertical cross sectional view of a containment vessel of a pressurized water nuclear power plant according to a fifth embodiment of the present invention.

FIG. 5 is a block diagram of a passive cooling and depressurization system shown with a vertical cross sectional view of a containment vessel of a pressurized water nuclear power plant according to a fifth embodiment of the present invention.

In the containment vessel according to this embodiment, the pressure suppression chamber 12 is located outside the main containment vessel 7. The lower vessel 11 and the pressure suppression pool 13 communicate with each other through an LOCA vent pipe 15. The gas phase of the pressure suppression chamber 12 communicates with the upper vessel 10 through a gas phase vent pipe 29.

Thus, a large space is provided as part of the containment vessel and isolated by the diaphragm 9, and this large space (upper vessel 10) communicates with the pressure suppression chamber 12 through the gas phase vent pipe 29. With this arrangement, the space in the upper vessel 10 is utilized as a de facto gas phase of the pressure suppression chamber 12.

Also in this embodiment, the PCCS building 20 is constructed integrally on the pressure suppression chamber 12. The passive containment collecting system 21 is located in the PCCS building 20 so that the containment vessel can be cooled with high reliability in case of an accident.

The PCCS pool 22 of the passive containment cooling system 21 for cooling the containment vessel in case of an accident is located outside the main containment vessel 7. The PCCS pool water 23 is clean cooling water that is free from radioactivity even in case of an accident and the gas phase of the PCCS pool 23 communicates with the external air through an air outlet (not shown). If the PCCS pool water 23 is boiled to generate steam by heating, the steam is directly discharged to the external air that is the ultimate heat sink.

The pressure suppression pool water 14 is located lower than the PCDS pool 35. With this arrangement, the following advantage can be attained that the non-condensable gas accumulated in the PCDS heat exchanger 37 is smoothly discharged into the pressure suppression pool water 14 by gravity even if the gas partly accompanies some coolant when the vent valves 43 and 44 are opened to vent the non-condensable gas.

Sixth Embodiment

Figure 6:
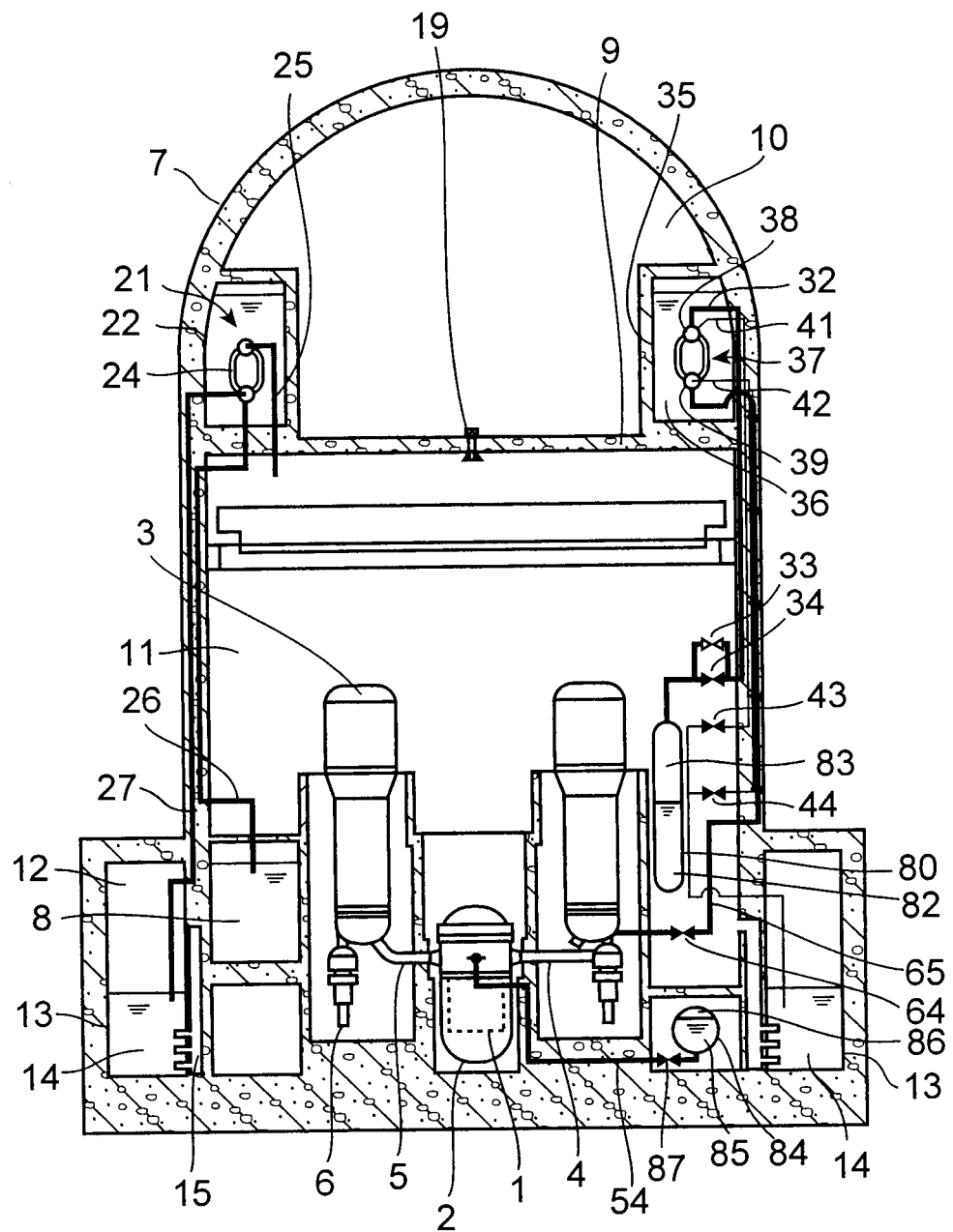
FIG. 6 is a block diagram of a passive cooling and depressurization system shown with a vertical cross sectional view of a containment vessel of a pressurized water nuclear power plant according to a sixth embodiment of the present invention.

FIG. 6 is a block diagram of a passive cooling and depressurization system shown with a vertical cross sectional view of a containment vessel of a pressurized water nuclear power plant according to a sixth embodiment of the present invention.

In the containment vessel according to this embodiment, as the fifth embodiment, the pressure suppression chamber 12 is located outside the main containment vessel 7. The lower vessel 11 and the pressure suppression pool 13 communicate with each other through an LOCA vent pipe 15. The gas phase of the pressure suppression chamber 12 communicates with the upper vessel 10 through a gas phase vent pipe 29 (see FIG. 5).

The passive containment cooling system (PCCS) pool 22 and the PCCS heat exchanger 24 are provided in the upper vessel 10. The PCCS pool water 23 is clean cooling water that is free from radioactivity even in case of an accident and the gas phase of the PCCS pool 23 communicates with the external air through an air outlet (not shown). If the PCCS pool water 23 is boiled to generate steam by heating, the steam is directly discharged to the external air that is the ultimate heat sink.

The PCDS pool 35 is located in the upper vessel 10. The PCDS pool water 36 is clean cooling water that is free from radioactivity even in case of an accident and the gas phase of the PCDS pool 35 communicates with the external air through an air outlet. If the PCDS pool water 36 is boiled to generate steam by heating, the steam is directly discharged to the external air that is the ultimate heat sink. In other words, the PCDS pool 35 is located in the upper vessel 10 but it is an external cooling pool that is isolated from the other space in the upper vessel 10 and communicates with the external air.

Since both the PCCS pool 22 and the PCDS pool 35 are located in the main containment vessel 7, these systems that are important for safety are protected very firmly against aircraft crashes.

The pressure suppression chamber 12 is located at the lowermost level outside of the main containment vessel 7. Therefore, it can be completely protected against aircraft crashes by being buried in the ground. Thus, all the facilities that are essential to the safety of the nuclear power plant can be contained in the containment vessel enclosure or buried in the ground, the nuclear power plant is highly safe and protected against aircraft crashes.

In FIG. 6, the steam supply pipe 32, the coolant return pipe 65 and the noncondensable gas vent pipes 41 and 42 are extending in the wall of the main containment vessel 7 from a view point of arrangement efficiency, they may extend inside or outside the containment vessel main body 7.

Other Embodiment

Above mentioned embodiments are just examples, and the present invention is not limited to these. Also each feature of the embodiments can be combined together.

What is claimed is:

1. A passive cooling and depressurization system for a pressurized water nuclear plant having a reactor pressure vessel for containing a reactor core cooled by primary coolant, a steam generator connected to the reactor pressure vessel by a hot leg pipe and a cold leg pipe, and a containment vessel containing the reactor pressure vessel, the steam generator, the hot leg pipe and the cold leg pipe, the passive cooling and depressurization system comprising:

a pressurizer connected to the hot leg pipe by a riser pipe for pressurizing an inside of a reactor pressure boundary where the primary coolant flows;

a cooling water pool;

a heat exchanger installed in the cooling water pool including an upper header, a lower header and a heat exchanger tube;

a steam supply piping extending from a gas phase of the pressurizer to the upper header of the heat exchanger;

a steam supply valve equipped on the steam supply piping;

a coolant return pipe extending from the heat exchanger to a liquid phase of the reactor pressure boundary; and an outlet valve equipped on the coolant return pipe, wherein the heat exchanger exchanges heat between water stored in the cooling water pool and steam supplied through the steam supply piping.

2. The passive cooling and depressurization system of claim 1, wherein the steam supply valve is a steam regulator valve that is configured to regulate a flow rate at steam through the steam supply valve.

3. The passive cooling and depressurization system of claim 1 further comprising a depressurizing valve equipped on the steam supply piping in parallel with the steam supply valve, wherein the steam supply valve allows steam of a quantity equivalent to a quantity of steam generated by decay heat of the reactor core to pass through the steam supply valve.

4. The passive cooling and depressurization system of claim 1, wherein at least part of the heat exchanger is arranged above a liquid level in the pressurizer.

5. The passive cooling and depressurization system of claim 1, wherein cooling water pool is an in-containment refueling water storage tank.

6. The passive cooling and depressurization system of claim 1, wherein the cooling water pool is arranged outside the containment vessel and a gas phase of the cooling water pool communicates with air external to the containment vessel.

7. The passive cooling and depressurization system of claim 6, wherein the cooling water pool communicates with a passive containment cooling system pool.

8. The passive cooling and depressurization system of claim 1, wherein the containment vessel is partitioned into a first space and a second space containing the reactor pressure boundary by a diaphragm, the cooling water pool is arranged in the first space, and a gas phase of the cooling water pool communicates with an external air.

9. The passive cooling and depressurization system of claim 8, wherein the cooling water pool communicates with a passive containment, cooling system pool.

10. The passive cooling and depressurization system of claim 1, further comprising a vent pipe connected to the heat exchanger for venting noncondensable gases into the containment vessel and a vent valve being equipped on the vent pipe.

11. The passive cooling and depressurization system of claim 10, wherein an end of the vent pipe opposite to an end connected to the heat exchanger is open in a pressure suppression pool water stored in a pressure suppression chamber.

12. A pressurized water nuclear plant comprising:
a reactor core cooled by primary coolant;
a reactor pressure vessel containing the reactor core;
a steam generator connected to the reactor pressure vessel by a hot leg pipe and a cold leg pipe;
a pressurizer of the pressurized water nuclear plant connected to the hot leg pipe by a riser pipe for pressurizing inside of a reactor pressure boundary where the primary coolant flows;
a containment vessel containing a reactor pressure vessel, the steam generator, the hot leg pipe, the cold leg pipe, the riser pipe and the pressurizer;
a cooling water pool;
a heat exchanger installed in the cooling water pool, the heat exchanger including an upper header, a lower header and a heat exchanger tube;
a steam supply piping extending from a gas phase of the pressurizer to the upper header of the heat exchanger;
a steam supply valve equipped on the steam supply piping;
a coolant return pipe extending from the heat exchanger to a liquid phase of the reactor pressure boundary; and
an outlet valve equipped on the coolant return pipe,
wherein the heat exchanger exchanges heat between water stored in the cooling water pool and steam supplied through the steam supply piping.

* * * * *